Nov. 14, 1967  E. BERGLES  3,352,175
SPEED-CHANGE GEARING (GEARING HUB) FOR BICYCLES
Filed April 19, 1965  3 Sheets-Sheet 3

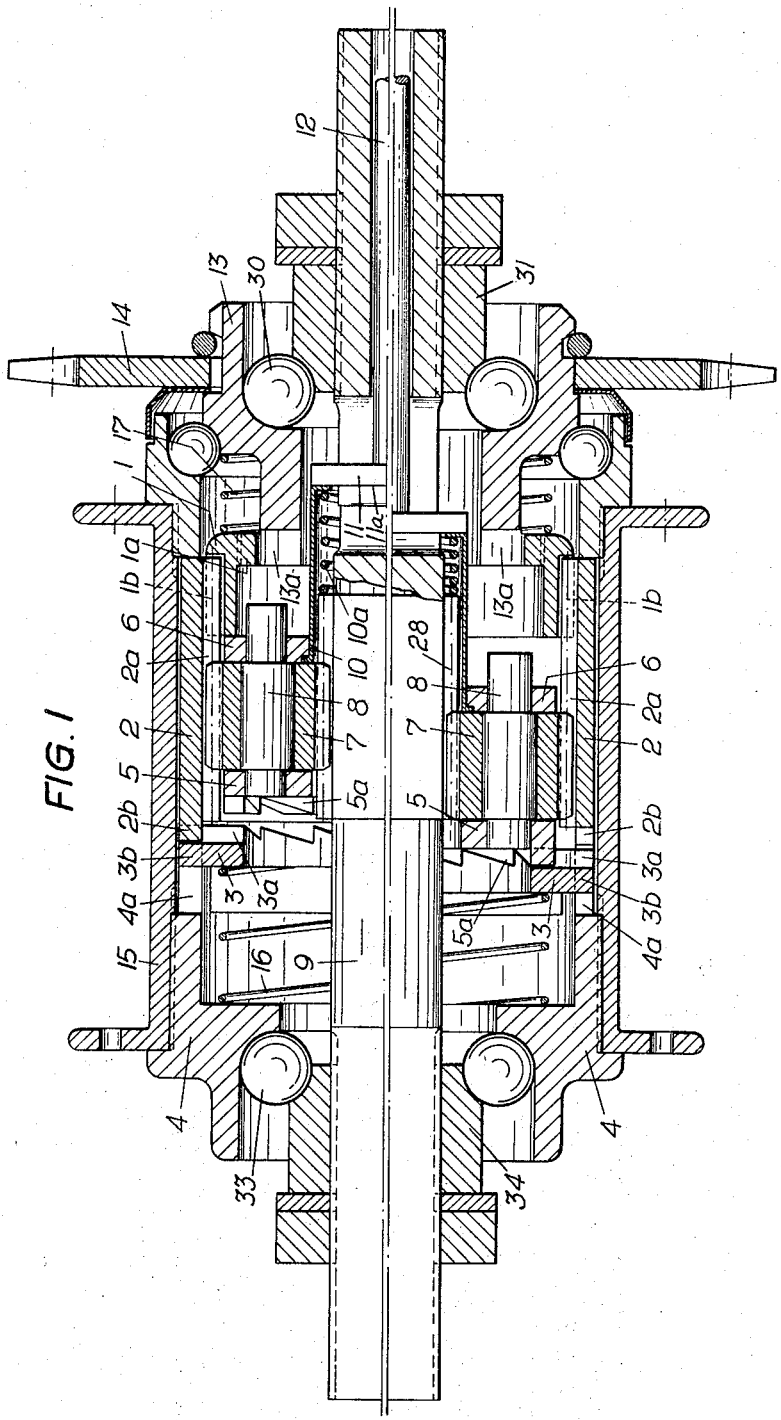
FIG. I

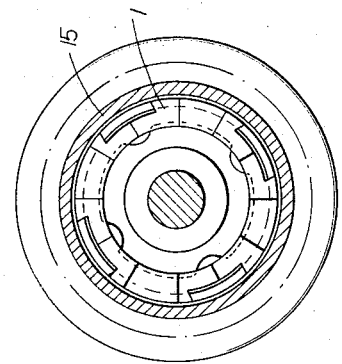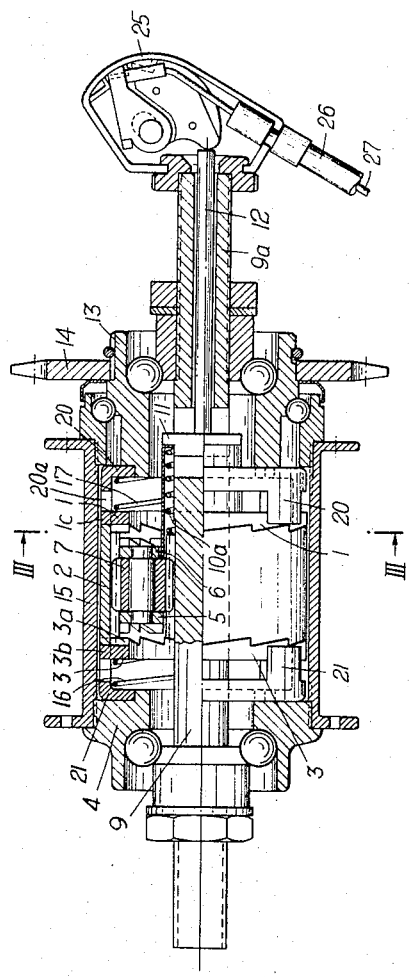

United States Patent Office 3,352,175
Patented Nov. 14, 1967

3,352,175
SPEED-CHANGE GEARING (GEARING HUB)
FOR BICYCLES
Eduard Bergles, Vaterdorfstrasse 42, Graz, Austria
Filed Apr. 19, 1965, Ser. No. 449,007
Claims priority, application Austria, Apr. 20, 1964,
A 3,452/64
5 Claims. (Cl. 74—750)

ABSTRACT OF THE DISCLOSURE

A variable speed transmission for bicycles has planetary gearing meshing with an axially fixed, rotatable ring gear and with a stationary sun gear along which the planetary gearing is axially movable to first, second and third positions, and independently rotatable driving and driven hub assemblies including driving and driven members, respectively, which are axially displaceable by the planetary gearing, the driving hub assembly being coupled to the ring gear through the driving member when the planetary gearing is in its first or second position and being coupled to the planetary gearing when the latter is in its third position, and the driven hub assembly being coupled to the planetary gearing when the latter is in its first position and being coupled to the ring gear through the driven member when the planetary gearing is in either its second or third position. A freewheeling arrangement is provided either in the coupling of the driven member to the ring gear or to the planetary gearing, or within the driven hub assembly.

---

This invention relates to variable speed transmissions. More particularly, it relates to planetary transmissions which in addition to their function of providing variable speed transmission also must possess a freewheeling feature. One application of the present invention is the provision of a variable speed transmission for use in bicycles.

It is an object of this invention to provide a variable speed planetary transmission which permits freewheeling.

It is another object of this invention to provide a transmission of simple construction so as to be highly dependable and easily and inexpensively manufactured. This object is attained by providing an apparatus having comparatively few parts and in which pairs of identical parts can be used in each transmission.

These and other objects will become apparent when the following description of several preferred embodiments of the present invention is read in light of the annexed claims and accompanying drawings in which:

FIG. 1 is a front elevation in section of a first embodiment showing gear positions for two different transmission speeds, one gear position being above and the other being below the center line.

FIG. 2 is a front elevation in section of a second embodiment.

FIG. 3 is a side view in section along either of the lines III—III in FIG. 2.

FIG. 4 is a front view in section of part of the apparatus of FIG. 2 showing the position of the parts when the transmission is giving its highest output speed.

FIG. 5 is a front section showing part of the apparatus in FIG. 2 when the parts are in position to transmit an intermediate speed.

FIG. 6 is a front view in section of part of the apparatus in FIG. 2 showing the position of parts when the transmission is giving its lowest output speed.

Figure 8:
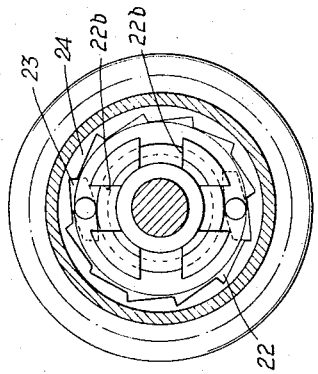
FIG. 8 is a side view in section taken along the line VIII—VIII of FIG. 7.

In FIG. 1 there is shown a gear 14 which is driven by a power source (not shown) such as a chain. The gear 14 is secured to the driving hub 13 which is rotatably connected with the shaft 9 to rotate about that shaft. This is accomplished through the ball bearings 30 and the bearing cone 31. The driving hub 13 has radially outward directed teeth adjacent its inner end which are shown engaging the claws 1a of the annular driving member 1. Hub 13 further has radial slots 13a which open axially at its inner end. The driving member 1 has, in addition to the claws 1a, teeth 1b which are shown engaged with the internal teeth 2a of the ring gear 2 which is rotatable, but suitably held against axial displacement. The driving member 1 is biased to the left by the spring 17; however, its movement to the left is restricted by a protruding shoulder (not numbered) engageable with an adjacent end of ring gear 2. The ring gear 2 is in mesh with the planetary gears 7 which in turn are in mesh with the stationary sun gear 28. The planetary gears are supported at their axles 8 by an assembly which includes the gear supports 5 and 6. The planetary gears are slidable along the sun gear while in mesh. This feature of sliding the plantary gears along the axis of the sun gear is necessary to vary the transmission speed as will be explained hereinafter. It is accomplished by moving the assembly of the planetary gears and gear supports 5 and 6 against the bias of the spring 10a through the sleeve 10 which is actuated by the push rod 12 and its integral wedge 11 having a shoulder 11a. A driven hub 4 is mounted on the shaft 9 through the ball bearings 33 and the cone 34. The driven hub has claws 4a which engage through the claws 3b the annular driven member 3 which rotates about the shaft 9 along with the driven hub 4. The driven member 3 has escapement teeth 3a which are shown in mesh with the escapement teeth 2b which project laterally from the ring gear 2. The planetary gear support 5 is provided with escapement teeth 5a which are adapted to engage the escapement teeth 3c of the driven member 3 when the planetary gear assembly is moved to the left as shown in the lower part of the drawing. The driven member 3 is biased toward the right by the coil spring 16 but is limited in its rightward movement by the abutment of the escapement teeth 3a with the escapement teeth 5a. The transmission is shown in FIG. 1 positioned within the driving wheel of a bicycle so that the gear 14 is driven by a pedal chain. The element 15 represents the hub of the bicycle wheel which is fixed to the driven hub 4. The wheel hub 15, driven hub 4 and driven member 3 form a driven hub assembly and turn at the same rotational speed.

In operation, the planetary gears 7 are moved into three different positions by the push rod 12 so as to give three different relative speeds between the driven hub 4 and the driving hub 13. When a low speed, but high torque, output is required, the planetary gear assembly is moved to the left to a first position as shown in the lower half of FIG. 1. The planetary gear support 5 pushes the driven member 3 out of engagement with the ring gear 2 while the escapement teeth 5a of the support 5 engage the escapement teeth 3a of the driven member 3. The driving member 1 is biased by the spring 17 so that it is in engagement with the driving hub 13 through the radially outward directed teeth at the inner end of the latter and at the same time engages through its teeth 1b the ring gear 2. Thus, the gear 14 drives the driving hub 13 which is locked to the ring gear 2 by the driving member 1 so that the ring gear 2 moves at the same speed as the driving hub 13. The ring gear 2 drives the planetary gear 7 which causes the planetary gear supports 5 and 6 to rotate about the shaft 9 with the planetary gears 7.

The support 5 drives the driven member 3 through the escapement engagement created by the teeth 5a and 3a. The driven member 3 drives the driven hub 4 through the claws 3b.

Freewheeling, that is, permitting the wheel hub 15 and the driven hub 4 which is secured to it, to turn faster than the driving hub 13 and the gear 14 is accomplished through the escapement connection between the gear support 5 and the driven member 3. During freewheeling escapement teeth 3a will ride up over the escapement teeth 5a as the driven member 3a oscillates laterally against the bias of the coil spring 16.

When it is desired to have a mechanical output of a higher speed but lower torque, the planetary gear assembly is moved to the right to a second position as shown in the top half of FIG. 1. There, the escapement teeth 3a and 5a disengage while the driven member 3 is moved to the right by the spring 16 so as to engage the ring gear 2 at its escapement teeth 2b. In this position the motion is conducted through the gear 14, driving hub 13, driving member 1 and ring gear 2 directly to the driven member 3 and the driven hub 4. In other words, the planetary gears are not used to increase or multiply mechanical speed. The freewheeling effect is realized in this gear position because the driven member 3 will rotate at the same speed as the driven hub 4 and wheel hub 15, the driven member 3 becoming disengaged from the planetary gear support 5 because of the escapement engagement between those two elements.

When it is desired to have an output of maximum speed, the planetary gear assembly is moved further to the right to a third position. This position is not shown in FIG. 1. The gear axles 8, which constitute projections are moved into slots 13a on the driving hub 13 and the planetary gear support 6 abuts against the driving member 1 to move it to the right so as to be out of engagement with the ring gear 2 and the driving hub 13. The driven member 3 is in engagement with the ring gear 2 as shown in the upper half of FIG. 1. When the transmission is in this position, the gear 14 drives the driving hub 13 which drives the planetary gear assembly around the sun gear 28. The ring gear is thus rotated at a higher rotational speed than the planetary gear assembly and the driven member 3 is engaged by and turns with the ring gear 2.

The freewheeling effect is present because of the escapement engagement between the driven member 3 and the ring gear 2.

In FIG. 2 there is shown a second embodiment of the invention. This embodiment differs from the embodiment of FIG. 1 primarily because there is provided an escapement engagement between the driving member 1 and the ring gear 2 and between the driving member 1 and the planetary gear assembly. Another difference is that the driving hub 13 has secured to it an annular ring 20 which engages the driving member 1. The driving member 1 has claws 1c which are engaged within slots 20a of the annular ring 20 so that the driving member 1 will rotate with the annular ring 20. The driving member 1 which is biased by the spring 17 toward the left is provided with escapement teeth 1d as shown in FIG. 4. The gear support 6 is provided with the escapement teeth 6a for engagement with the escapement teeth of the driving member 1. The ring gear 2 has a rim of escapement teeth 2c to engage the escapement teeth 1d of the driving member 1 as shown in FIG. 5. The driven hub 4 is provided with an annular ring 21 which has slots 21a to engage the claws 3b so that the driven member 3 rotates with the driven hub 4. As in the previously discussed first embodiment, the driven member 3 is provided with escapement teeth 3a to engage either the escapement teeth 2b of the ring gear 2 or the escapement teeth 5a of the planetary gear assembly.

The highest or third transmission speed occurs when the planetary gear assembly is moved to the right to its third position as shown in FIG. 4. It pushes the driving member 1 against the spring 17 and out of engagement with the ring gear 2 and at the same time, the escapement teeth 6a engage the escapement teeth 1d of the driving member. The spring 16 biases the driven member 3 against the escapement teeth 2b of the ring gear 2 to form another escapement engagement. As the driving member 1 is turned with the driving hub 13 and the gear 14, the planetaary gear assembly turns with it due to the escapement engagement. The planetary gear 7, in mesh with the sun gear 28, rotates as the planetary gear assembly turns about the axis of the shaft 9 and causes the ring gear 2 to rotate with a greater rotational speed than the planetary gear assembly. The escapement engagement between the ring gear 2 and the driven member 3 causes the driven member 3, annular ring 21 and the driven hub 4 to rotate with the ring gear 2. If the driven hub 4 receives rotational energy in addition to that it receives from the transmission, it can freewheel because two escapements are provided. They are between the driving member 1 and the planetary gear support 6 and between the driven member 3 and the ring gear 2.

If an intermediate transmission speed is desired, the planetary gear assembly is moved to its second position as shown in FIG. 5. The driving member 1 and the driven member 3 are biased by the springs 17 and 16, respectively, into engagement with the ring gear 2 as shown. As the driving member 1 turns with the driving hub 13 and gear 14, it will drive the ring gear 2 which in turn will drive the driven member 3. Here, the freewheeling effect is realized through the escapement engagements between the ring gear 2 and the driving member 1 and the driven member 3.

The lowest transmission speed will occur when the planetary gear assembly is moved to its first position as shown in FIG. 6. The driven member 3 is pushed against the spring 16 out of engagement with the ring gear 2 while the escapement teeth 5a of the planetary gear support 5 mesh with escapement teeth 3a of the driven member 3. As the driving member 1 turns with the driving hub 13 and the gear 14, it engages the ring gear 2 through the escapement teeth 1d. The ring gear 2, in mesh with the planetary gear 7, causes that gear to rotate about the sun gear 28. The planetary gear assembly rotates about the axis of the shaft 9 with the planetary gear 7 and because of the escapement engagement with the driving member 3, the annular ring 21 and driven hub 4 are turned. Freewheeling is possible because of the escapement engagement between the driving member 1 and the ring gear 2 and because of the escapement engagement between the planetary gear support 5 and the driven member 3.

Figure 7:
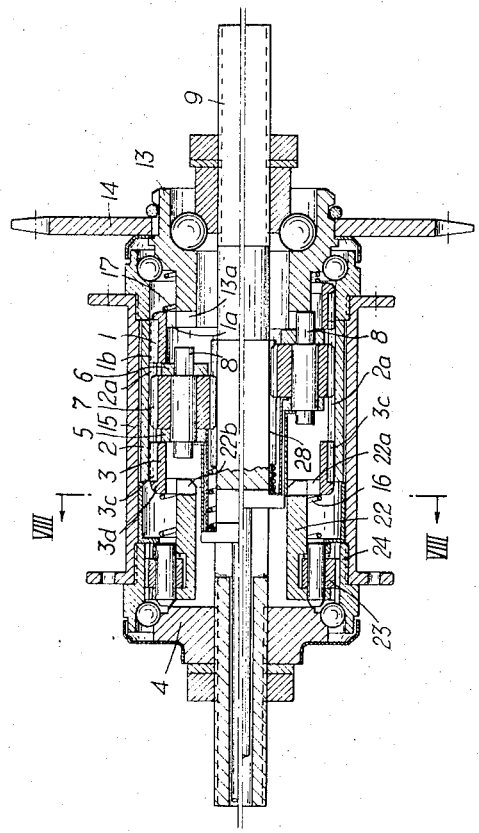
FIG. 7 is a front view in section of a third embodiment showing two different gear positions, one above and one below the center line.

The third embodiment of the invention is shown in FIG. 7. This embodiment differs from the previously discussed first and second embodiments primarily in that the freewheeling effect is made possible by the cooperation of a pawl and a notched or toothed wheel rather than by the engagement of escapement-toothed members. The gear 14, driving hub 13, driving member 1, ring gear 2, planetary gear 7, gear axle 8 and sun gear 28 are all identical to their corresponding parts in the first embodiment of FIG. 1. The driven member, however, is, in the embodiment of FIG. 7, similar to the driving member 1. The driven member 3 has teeth 3c which are shown in mesh with the ring gear 2 and claws which engage the claws 22a of the freewheel body 22. The driven member 3 is biased toward the right by the spring 16 but is limited in its rightward movement by the collar 3d. The freewheel 22 has pawls 23 pivoted to it about its outer circumference. These pawls are engageable with cooperating notches or ratchet teeth in the ring gear 24 which surrounds the freewheel 22.

In operation, the lowest speed of transmission will occur when the planetary gear assembly is moved to the left to move the driven member 3 out of engagement with the ring gear 2 and the freewheel 22. The gear axle 8 will be received in one of the slots 22b of the freewheel 22. As the ring gear 2 turns with the driving member 1, the driving hub 13 and the gear 14, the planetary gear 7 will rotate about the sun gear 28. The gear axle 8 will drive the freewheel which in turn will drive the ring 24 through the pawls 23. Freewheeling, of course, is possible because of the presence of the pawls between the freewheel 22 and the ring 24. Unless freewheeling is present, the driven hub assembly, that is, the wheel hub 15, the driven hub 4, the ring 24 and freewheel 22 will all turn at the same speed.

An intermediate transmission speed is attained by moving the gear to the center in the position shown at the top of FIG. 7 because the driving member 1 engages the driving hub 13 and the ring gear 2 and because the driven member 3 engages the ring gear 2 and the freewheel 22, the freewheel will turn with the ring gear 2 and the driving hub 13.

The highest transmission speed is attained by moving the gear to the right as shown at the bottom part of FIG. 7. The axle 8 is received in one of the slots 13a while the planetary gear support 6 pushes the driving member 1 against the bias of spring 17 and out of engagement with ring gear 2 and the driving hub 13. The planetary gear assembly turns with the driving hub 13 to rotate the ring gear 2 at high speed. This speed of rotation is transmitted through the driven member 3 to the freewheel 22 and on to the ring 24 through pawls 23 through the driven hub 4.

The planetary gear assembly can be moved into its three positions by means illustrated in FIGS. 1, 2 and 7. The planetary gear assembly is attached to a sleeve 10 which is biased by a spring 10a as shown in FIGS. 1 and 2. The sleeve 10 is moved by a push rod 12 which is disposed in the shaft 9 and has a projecting wedge 11 which engages the sleeve. The push rod can be actuated by an arresting device 25 shown in FIG. 2. The person operating the transmission operates the arresting device by means of the Bowden cable 26, 27.

It is to be understood that the foregoing description sets forth only several embodiments of the present invention. Other embodiment may be made without departing from the scope of the invention as defined in the following claims.

The following is claimed:

1. A variable speed transmission comprising a stationary sun gear, a planetary gear assembly including support means rotatable about, and movable axially relative to said sun gear and a plurality of planetary gears rotatable in said support means and meshing with said sun gear to orbit about the latter, an axially fixed ring gear rotatable about said sun gear and having internal teeth meshing with said planetary gears, means for moving said planetary gear assembly axially relative to said sun gear to a selected one of first, second and third positions which respectively correspond to low, intermediate and high speed transmission ratios, driving and driven hub assemblies mounted for rotation independently of each other about the axis of said sun gear, said driving hub assembly including a driving member which is rotatable about said axis and displaceable in the direction thereof, said driven hub assembly including a driven member which is rotatable about said axis and displaceable in the direction thereof, first coupling means rotatably coupling said ring gear to said driving hub assembly by way of said driving member so long as said planetary gear assembly is in either of said first and second positions and being disengaged in response to axial displacement of said driving member by movement of said planetary gear assembly to said third position, second coupling means rotatably coupling said support means of the planetary gear assembly to said driving hub assembly only upon movement of said planetary gear assembly to said third position, third coupling means rotatably coupling said support means of the planetary gear assembly to said driven hub assembly only upon movement of said planetary gear assembly to said first position, and fourth coupling means rotatably coupling said ring gear to said driven hub assembly by way of said driven member so long as said planetary gear assembly is in either of said second and third positions and being disengaged in response to axial displacement of said driven member by movement of said planetary gear assembly to said first position.

2. A variable speed transmission according to claim 1; in which said driving hub assembly further includes a rotated driving hub; said first coupling means includes external teeth on said driving hub, internal claws on said driving member engageable with said external teeth of said driving hub, external teeth on said driving member engageable with said internal teeth of the ring gear and spring means urging said driving member axially in the direction to engage said claws thereof with said teeth of the driving hub and to engage said teeth of the driving member with said teeth of the ring gear; said support means of the planetary gear assembly being engageable with said driving member upon movement to said third position to displace said driving member axially in opposition to said spring means acting on the latter and thereby disengage said driving member from said driving hub and ring gear; and said second coupling means includes at least one projection extending from said support means of the planetary gear assembly, said driving hub having at least one radial slot opening axially to receive said projection for directly coupling said driving hub to said support means of the planetary gear assembly upon movement of the latter to said third position.

3. A variable speed transmission according to claim 1; in which said driven hub assembly further includes a driven hub to which said driven member is rotatably coupled in all of said positions of the planetary gear assembly; said third coupling means includes escapement teeth on said driven member, escapement teeth on said support means of the planetary gear assembly engageable with said escapement teeth of the driven member upon movement of said planetary gear assembly to said first position, and spring means acting axially on said driven member to maintain engagement of said escapement teeth thereof with said escapement teeth of said support means; and said fourth coupling means includes escapement teeth on said ring gear with which said escapement teeth of the driven member are engaged by the urging of said spring means acting on the driven member upon movement of said planetary gear assembly to either of said second and third positions thereof.

4. A variable speed transmission according to claim 1; in which said driving and driven assembles further include driving and driven hubs to which said driving and driven members respectively are rotatably coupled in all of said positions of the planetary gear assembly, said driving and driven members are disposed at opposite sides of said ring gear and planetary gear assembly, spring means urge said driving and driven members axially toward said ring gear and planetary gear assembly, said driving and driven members have escapement teeth facing toward said ring gear and planetary gear assembly, said first and second coupling means include escapement teeth at one side of said ring gear and at one side of said support means of the planetary gear assembly, respectively, which are engaged with said escapement teeth of the driving member in said first and second positions of said planetary gear assembly and in said third position of the planetary gear assembly, respectively, and said third and fourth coupling means include escapement teeth at the other side of said support means of the planetary gear assembly and at the other side of said ring gear, respectively, which are engaged with said escapement teeth of the driven member in said first position of the planetary gear assembly and in said second and third positions of the planetary gear assembly, respectively.

5. A variable speed transmission according to claim 1; in which said driven hub assembly further includes a freewheel mounted to rotate about said axis of the sun gear and having pawl means pivoted on said freewheel, and a driven hub mounted to rotate about said axis and including a ring having ratchet teeth therein engageable by said pawl means to drive said driven hub from said freewheel and to permit said driven hub to rotate faster than said freewheel; said third coupling means includes at least one projection extending from said support means of the planetary gear assembly, said freewheel having at least one radial slot opening axially to receive said projection for directly coupling said support means to said freewheel upon movement of said planetary gear assembly to said first position; and said fourth coupling means includes external teeth on said freewheel, internal claws on said driven member engageable with said external teeth of the freewheel, external teeth on said driven member engageable with said internal teeth of the ring gear and spring means urging said driven member axially in the direction to engage said claws thereof with said teeth of the freewheel and to engage said teeth of the driven member with said teeth of the ring gear, said support means of the planetary gear assembly being engageable with said driven member upon movement to said first position to displace said driven member axially in opposition to said spring means acting thereon and thereby disengage said driven member from said freewheel and from said ring gear.

References Cited

UNITED STATES PATENTS

| 753,785 | 3/1904 | Archer | 74—750 |
| 832,442 | 10/1906 | Archer | 74—750 |
| 2,143,798 | 1/1939 | Ribe | 74—750 |
| 2,787,173 | 4/1957 | Bergles | 74—750 |
| 2,982,154 | 5/1961 | Zapletal | 74—750 |

FOREIGN PATENTS

| 909,663 | 4/1954 | Germany. |
| 576,610 | 4/1946 | Great Britain. |

DONLEY J. STOCKING, *Primary Examiner.*

THOMAS C. PERRY, *Examiner.*